Oct. 10, 1944.  H. BANY  2,360,098
AUTOMATIC SWITCHING EQUIPMENT
Filed Jan. 8, 1943
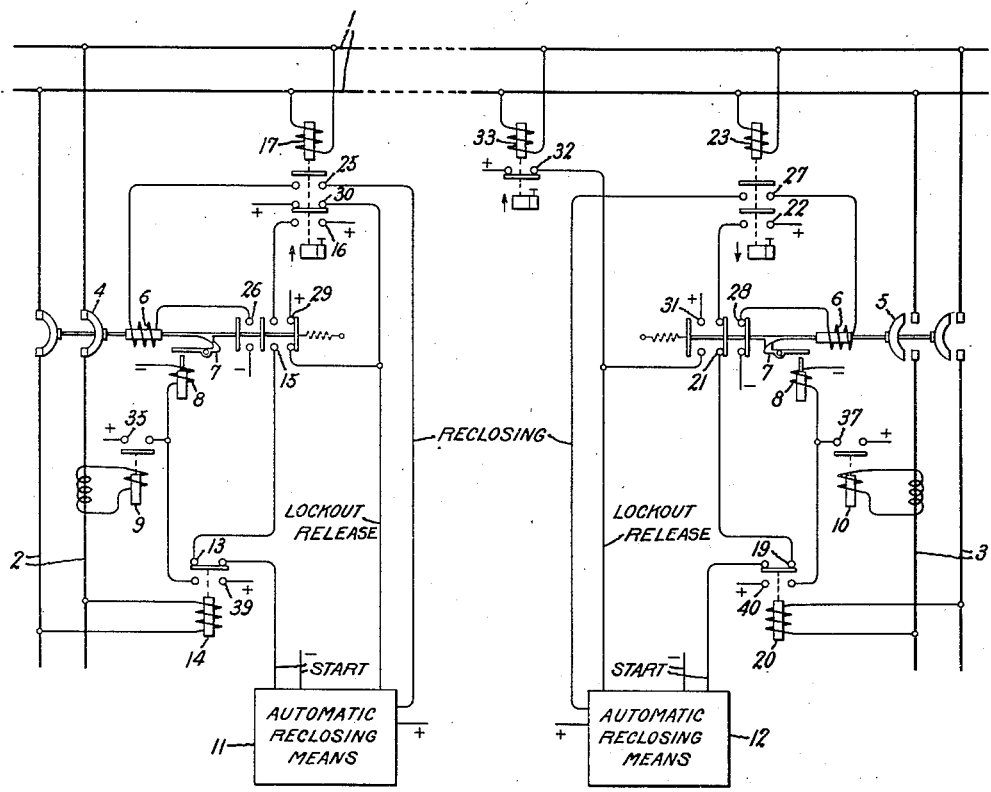
Inventor:
Herman Bany,
by Harry E. Dunham
His Attorney.

Patented Oct. 10, 1944

2,360,098

UNITED STATES PATENT OFFICE 2,360,098

AUTOMATIC SWITCHING EQUIPMENT

Herman Bany, Lansdowne, Pa., assignor to General Electric Company, a corporation of New York Application January 8, 1943, Serial No. 471,691

9 Claims. (Cl. 171—97)

My invention relates to automatic switching equipments and particularly to equipments for controlling the connections between a load circuit and two supply circuits so that current is supplied to the load circuit from one of the two supply circuits when both of them are energized and from the energized supply circuit when only one of them is energized. In some installations, the two supply circuits are connected to the load circuit at points some distance apart, and one object of my invention is to provide an improved automatic switching equipment for controlling the connections between a load circuit and two supply circuits which requires no control wires between the two points at which the connections to the load circuit are made.

My invention will be better understood from the following description when taken in connection with the accompanying drawing, the single figure of which diagrammatically illustrates an automatic switching equipment for controlling the connection of two supply circuits to a common load circuit, and the scope of my invention will be pointed out in the appended claims.

Referring to the drawing, 1 represents a load circuit which is arranged to be supplied with current at two different points by the supply circuits 2 and 3, respectively. While I have shown single phase circuits in order to simplify the disclosure, it will be evident to those skilled in the art that my invention is also applicable to polyphase and direct current circuits.

The supply circuits 2 and 3 are respectively connected to the load circuit 1 by the circuit breakers 4 and 5 which may be of any suitable type, examples of which are well known in the art. As shown in the drawing, the circuit breakers 4 and 5 are of the latched-in type, and each comprises a closing coil 6 which, when energized, closes the associated circuit breaker, a latch 7 for maintaining the associated circuit breaker in its closed position, and a trip coil 8 which, when energized, releases the associated latch 7 to effect the opening of the associated circuit breaker.

For effecting the opening of the circuit breaker 4 in response to a fault on the load circuit 1 when the load circuit is being supplied from the supply circuit 2, which, for the purpose of this description, is assumed to be the preferred source, I provide an overcurrent relay 9 which is connected in any suitable manner so that it is energized in accordance with the current flowing through the circuit breaker 4 and which, when energized more than a predetermined amount, completes an energizing circuit for the trip coil 8 of the circuit breaker 4 to effect the opening thereof. A similar overcurrent relay 10 is also provided for effecting the opening of the circuit breaker 5 when the current through it exceeds a predetermined value.

For effecting the opening of the circuit breaker 4 in response to the voltage of the associated supply circuit 2 decreasing below a predetermined value, an energizing circuit for the trip coil 8 of the circuit breaker 4 is arranged to be completed by a voltage relay 14 when the voltage of the supply circuit 2 decreases below a predetermined value. The circuit breaker 5 is arranged to be opened in response to the voltage of the supply circuit 3 decreasing below a predetermined value by having an energizing circuit for the trip coil 8 of the circuit breaker 5 completed by a voltage relay 20 which is responsive to the voltage of the supply circuit 3.

The circuit breakers 4 and 5, respectively, have associated therewith suitable automatic reclosing means 11 and 12 for effecting the reclosure of the associated circuit breaker a predetermined number of times within a predetermined time interval after the operation of the reclosing means is initiated and with predetermined time intervals between successive reclosures of the associated circuit breaker and for preventing further reclosures of the associated circuit breaker if it is open at the expiration of said first mentioned time interval. Since such automatic reclosing means are well known in the art and the detailed circuits thereof form no part of my present invention, I have represented the automatic reclosing means 11 and 12 merely by suitably labeled rectangles. United States Patent 2,213,034, granted July 5, 1938 on an application filed by Arvid E. Anderson and assigned to the assignee of this application, discloses the details of an automatic reclosing arrangement which may be used as the automatic reclosing means 11 and 12.

In accordance with my invention, the operation of the automatic reclosing means 11 associated with the preferred source 2 is initiated immediately in response to the voltage of the load circuit 1 decreasing below a predetermined value if, at the same time, the voltage of the supply circuit 2 is above a predetermined value and the circuit breaker 4 is open, and the operation of the other automatic reclosing means 12 is initiated after the voltage of the load circuit 1 has remained below a predetermined value for a predetermined time and if, at the expiration of said predetermined time, the circuit breaker 5 is open and the voltage of the supply circuit 3 is above a predetermined value. These results are accomplished in the embodiment of my invention shown in the drawing by connecting in series in the start circuit of the automatic reclosing means 11 the contacts 13 of the voltage relay 14 which are closed when the voltage of the supply circuit 2 is above a predetermined value, the auxiliary contacts 15 on the circuit breaker 4 which are closed when the circuit breaker is open, and the contacts 16 of an instantaneous undervoltage relay 17 which are closed when the voltage of the load circuit 1 is below a predetermined value, and by connecting in series in the start circuit of the automatic reclosing means 12 the contacts 19 of the voltage relay 20 which are closed when the voltage of the supply circuit 3 is above a predetermined value, the auxiliary contacts 21 on the circuit breaker 5 which are closed when the circuit breaker is open, and the contacts 22 of a time delay undervoltage relay 23 which are closed when the voltage of the load circuit 1 has remained below a predetermined value for a predetermined time. Due to the difference in the operating times of the undervoltage relays 17 and 23, it will be seen that whenever the load circuit voltage decreases below a predetermined value, the operation of the automatic reclosing means 11 is initiated immediately if, at the same time, the associated circuit breaker 4 is open and the associated supply circuit 2 is energized, but the operation of the automatic reclosing means 12 is initiated only in case the load circuit voltage remains below a predetermined value for a predetermined time and, at the expiration of that predetermined time, the circuit breaker 5 is open and the supply circuit 3 is deenergized. The time delay of the undervoltage relay 23 is preferably made long enough so that it is longer than the time elapsing between the initiation of the operation of the automatic reclosing means 11 and the first reclosure of the circuit breaker 4 effected thereby but shorter than the time elapsing between the subsequent reclosures effected by the reclosing means 11 so that the circuit can be reclosed and opened once before the operation of the automatic reclosing means 12 is initiated.

The automatic reclosing means 11, when in operation, effects at predetermined points in its cycle of operation the completion of an energizing circuit for the closing coil 6 of the circuit breaker 4 if, at the same time, the contacts 25 of the undervoltage relay 17 are closed and the circuit breaker 4 is open so that its auxiliary contacts 26 are closed. The automatic reclosing means 12, when in operation, effects at predetermined points in its cycle of operation the completion of an energizing circuit for the closing coil 6 of the circuit breaker 5 if, at the same time, contacts 27 of the undervoltage relay 23 are closed and the circuit breaker 5 is open so that its auxiliary contacts 28 are closed.

Each automatic reclosing means, after being in operation for a predetermined time, reaches its lockout position from which it is arranged to be restored to its normal position in case either the associated circuit breaker is closed or the voltage of the load circuit has remained above a predetermined value for a predetermined time. In the arrangement shown in the drawing, the automatic reclosing means 11 is moved out of its lockout position if either the contacts 29 of the circuit breaker 4 or the contacts 30 of the voltage relay 17 are closed while the reclosing means is in its lockout position. In a similar manner, the automatic reclosing means 12 is arranged to be moved out of its lockout position in case either the auxiliary contacts 31 of the circuit breaker 5 or the contacts 32 of a voltage relay 33 responsive to the voltage of the load circuit 1 are closed when the reclosing means 12 is in its lockout position.

The operation of the arrangement shown in the drawings is as follows: When the circuit breaker 4 is closed and both supply circuits are energized, the various control devices are in the positions in which they are shown in the drawing. When a fault occurs on the load circuit 1 which causes the overcurrent relay 9 to close its contacts 35, an energizing circuit is completed for the trip coil 8 of the circuit breaker 5 to effect the opening thereof. As soon as the circuit breaker 4 opens and the load circuit voltage decreases to a sufficient value to cause the instantaneous undervoltage relay 17 to close its contacts 16, the starting circuit of the automatic reclosing means 11 is completed through the auxiliary contacts 15 of the circuit breaker 4 and the contacts 13 of the voltage relay 14. The automatic reclosing means 11 then effects in a well-known manner the completion of an energizing circuit for the closing coil 6 of the circuit breaker 4 through the contacts 26 on the circuit breaker 4 and the contacts 25 of the voltage relay 17 before the time delay on the voltage relay 23 can initiate the operation of the automatic reclosing means 12. The closing of the circuit breaker 4 restores normal voltage across the load circuit so that if the circuit breaker 4 remains closed for a predetermined time after the initial reclosure thereof, the voltage relays 17 and 33 are restored to their normal positions.

If the circuit breaker 4 remains closed after the first reclosure thereof, the automatic reclosing means 11 continues its cycle of operation without effecting any further reclosures of the circuit breaker 4 and finally reaches its lockout position, from which position it is moved to its normal position by the lockout release circuit being completed through the parallel connected contacts 29 on the circuit breaker 4 and the contacts 30 of the voltage relay 17. It will be observed that the operation of the automatic reclosing means 12 is not initiated in case the circuit breaker 4 remains closed after the first reclosure thereof because the circuit breaker 4 is reclosed before the time delayed voltage relay 23 can close its contacts 22 in the start circuit for the automatic reclosing means 12.

If the circuit breaker 4 opens immediately after its initial reclosure, the automatic reclosing means 11 effects a second reclosure of the circuit breaker 4 a predetermined time after the first reclosure thereof. However, before the second reclosure of the circuit breaker 4 can occur, the time delayed undervoltage relay 23 closes its contacts 22 and completes the start circuit for the automatic reclosing means 12 through the auxiliary contacts 21 on the circuit breaker 5 and the contacts 19 of the voltage relay 20 if the supply circuit 3 is energized. The automatic reclosing means 12 then operates in a well-known manner to complete an energizing circuit for the closing coil 6 of the circuit breaker 5 through the contacts 27 of the undervoltage relay 23 and the auxiliary contacts 28 on the circuit breaker 5. If the fault is still connected to the load circuit when the circuit breaker 5 is closed, the overcurrent relay 10 immediately closes its contacts 37 and completes an energizing circuit for the trip coil 8 on the circuit breaker 5 to effect the opening thereof. The automatic reclosing means 11 and 12 are so designed that after the opening of the circuit breaker 5 the reclosing means 11 and 12 operate to effect the alternate closing of the circuit breakers 4 and 5 a predetermined number of times if the fault persists.

If the fault is removed before either of the automatic reclosing means reaches its lockout position, the first circuit breaker to be reclosed after the removal of the fault remains closed, and then both of the automatic reclosing means are restored to their normal position. If, however, the fault is a permanent one so that both of the automatic reclosing means are moved to their lockout positions while the load circuit voltage is below normal, further reclosing of the circuit breakers 4 and 5 is prevented.

If the supply circuit 2 fails while it is supplying current to the load circuit 1, the voltage relay 14 closes its contacts 39 and completes an energizing circuit for the trip coil 8 of the circuit breaker 4 to effect the opening thereof. As soon as the load circuit voltage decreases below a predetermined value and remains below this predetermined value for a sufficient length of time for the time delayed undervoltage relay 23 to close its contacts 27, the automatic reclosing means 12 operates in the manner heretofore described to effect the reclosing of the circuit breaker 5 if the supply circuit 3 is energized. It will be observed that the automatic reclosing means 11 cannot be started and the circuit breaker 4 cannot be reclosed as long as the supply circuit 2 is deenergized since the contacts 13 of the voltage relay 14 in the start circuit of the automatic reclosing means 11 are open.

If the supply circuit 3 fails while it is supplying current to the load circuit 1, the voltage relay 20 closes its contacts 40 and completes an energizing circuit for the trip coil 8 of the circuit breaker 5 to effect the opening thereof. As soon as the load circuit voltage decreases below a predetermined value, the instantaneous undervoltage relay 17 closes its contacts 16 so that the automatic reclosing means 11 operates in the manner above described to effect the reclosing of the circuit breaker 4 if the supply circuit 2 is energized so that the contacts 13 of the voltage relay 14 are closed.

After an automatic reclosing means has been locked out, it will be observed that it will be restored to its normal position in response to the load circuit voltage remaining above a predetermined value for a predetermined time. These results are accomplished by the relay 17 closing its contacts 30 in the lockout release circuit of the reclosing means 11 and by the relay 33 closing its contacts 32 in the lockout release circuit of the reclosing means 12.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In an electric system including a load circuit, a supply circuit, a circuit breaker for connecting said circuits together, a second supply circuit, a second circuit breaker for connecting said second supply circuit to said load circuit, and means for opening each circuit breaker, the combination of automatic reclosing means individual to each circuit breaker, and means responsive to the voltage of said load circuit decreasing below a predetermined value for initiating in a predetermined sequence the operations of said automatic reclosing means.

2. In an electric system including a load circuit, a supply circuit, a circuit breaker for connecting said circuits together, a second supply circuit, a second circuit breaker for connecting said second supply circuit to said load circuit, and means for opening each circuit breaker, the combination of automatic reclosing means individual to each circuit breaker, means responsive to the voltage of said load circuit decreasing below a predetermined value for initiating the operation of one of said automatic reclosing means, and means responsive to the voltage of said load circuit remaining below a predetermined value for a predetermined time for initiating the operation of the other of said automatic reclosing means.

3. In an electric system including a load circuit, a supply circuit, a circuit breaker for connecting said circuits together, a second supply circuit, a second circuit breaker for connecting said second supply circuit to said load circuit, and means for opening each circuit breaker, the combination of automatic reclosing means individual to each circuit breaker for effecting the closing of the associated circuit breaker a predetermined number of times within a predetermined time interval after the operation of the reclosing means is initiated and with predetermined time intervals between successive reclosures of the associated circuit breaker, and means responsive to the voltage of said load circuit decreasing below a predetermined value for initiating in a predetermined sequence the operations of said automatic reclosing means.

4. In an electric system including a load circuit, a supply circuit, a circuit breaker for connecting said circuits together, a second supply circuit, a second circuit breaker for connecting said second supply circuit to said load circuit, and means for opening each circuit breaker, the combination of automatic reclosing means individual to each circuit breaker for effecting the closing of the associated circuit breaker a predetermined number of times within a predetermined time interval after the operation of the reclosing means is initiated and with predetermined time intervals between successive reclosures of the associated circuit breaker, means responsive to the voltage of said load circuit decreasing below a predetermined value for initiating the operation of one of said automatic reclosing means, and means responsive to the voltage of said load circuit remaining below a predetermined value for a predetermined time for initiating the operation of the other of said automatic reclosing means.

5. In an electric system including a load circuit, a supply circuit, a circuit breaker for connecting said circuits together, a second supply circuit, a second circuit breaker for connecting said second supply circuit to said load circuit, and means for opening each circuit breaker, the combination of automatic reclosing means individual to each circuit breaker for effecting the closing of the associated circuit breaker a predetermined number of times within a predetermined time interval after the operation of the reclosing means is initiated and with predetermined time intervals between successive reclosures of the associated circuit breaker and for preventing further reclosures thereof if it is open at the expiration of said first mentioned predetermined time interval, means responsive to the voltage of said load circuit decreasing below a predetermined value for initiating in a predetermined sequence the operations of said automatic reclosing means, and means responsive to the voltage of said load circuit remaining above a predetermined value for a predetermined time for rendering operative an automatic reclosing means which has been rendered inoperative to effect further reclosures.

6. In an electric system including a load circuit, a supply circuit, a circuit breaker for connecting said circuits together, a second supply circuit, a second circuit breaker for connecting said second supply circuit to said load circuit, and means for opening each circuit breaker, the combination of automatic reclosing means individual to each circuit breaker for effecting the closing of the associated circuit breaker a predetermined number of times within a predetermined time interval after the operation of the reclosing means is initiated and with predetermined time intervals between successive reclosures of the associated circuit breaker and for preventing further reclosures thereof if it is open at the expiration of said first mentioned predetermined time interval, means responsive to the voltage of said load circuit decreasing below a predetermined value for initiating the operation of one of said automatic reclosing means, means responsive to the voltage of said load circuit remaining below a predetermined value for a predetermined time for initiating the operation of the other of said automatic reclosing means, and means responsive to the voltage of said load circuit remaining above a predetermined value for a predetermined time for rendering operative an automatic reclosing means which has been rendered inoperative to effect further reclosures.

7. In an electric system including a load circuit, a supply circuit, a circuit breaker for connecting said circuits together, a second supply circuit, a second circuit breaker for connecting said second supply circuit to said load circuit, and means for opening each circuit breaker, the combination of automatic reclosing means individual to each circuit breaker, an instantaneous undervoltage relay responsive to the voltage of said load circuit, a time delayed undervoltage relay responsive to the voltage of said load circuit, means responsive to the operation of said instantaneous undervoltage relay for initiating the operation of one of said automatic reclosing means, and means responsive to the operation of the time delayed undervoltage relay for initiating the operation of the other automatic reclosing means.

8. In an electric system including a load circuit, a supply circuit, a circuit breaker for connecting said circuits together, a second supply circuit, a second circuit breaker for connecting said second supply circuit to said load circuit, and means for opening each circuit breaker, the combination of automatic reclosing means individual to each circuit breaker for effecting the closing of the associated circuit breaker a predetermined number of times within a predetermined time interval after the operation of the reclosing means is initiated and with predetermined time intervals between successive reclosures of the associated circuit breaker, an instantaneous undervoltage relay responsive to the voltage of said load circuit, a time delayed undervoltage relay responsive to the voltage of said load circuit, means responsive to the operation of said instantaneous undervoltage relay for initiating the operation of one of said automatic reclosing means, and means responsive to the operation of the time delayed undervoltage relay for initiating the operation of the other automatic reclosing means.

9. In an electric system including a load circuit, a supply circuit, a circuit breaker for connecting said circuits together, a second supply circuit, a second circuit breaker for connecting said second supply circuit to said load circuit, and means for opening each circuit breaker, the combination of automatic reclosing means individual to each circuit breaker, and means responsive to the reduction of voltage of said load circuit below a predetermined value for less than a predetermined time for initiating the operation of only one of the said automatic reclosing means.

HERMAN BANY.